F. OPPENHEIMER.
RAILWAY TICKET.
APPLICATION FILED MAR. 20, 1908.
1,035,997.
Patented Aug. 20, 1912.
2 SHEETS—SHEET 1.
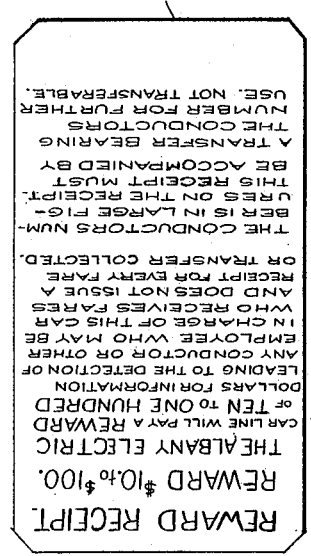
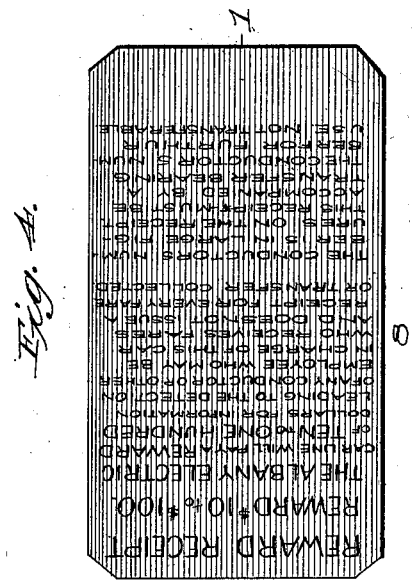
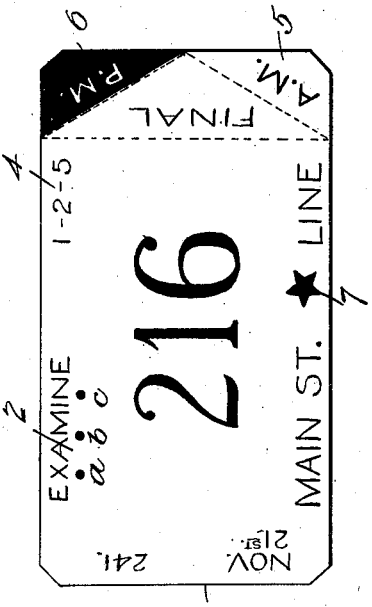
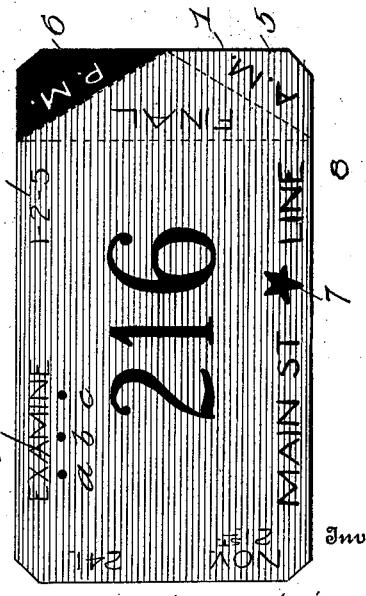
Witnesses
Inventor
Fred Oppenheimer
By
Attorney

F. OPPENHEIMER.
RAILWAY TICKET.
APPLICATION FILED MAR. 20, 1908.

1,035,997.

Patented Aug. 20, 1912.
2 SHEETS—SHEET 2.

Fig. 5.

Fig. 6.

Inventor
Fred Oppenheimer

Witnesses

By
Attorney

UNITED STATES PATENT OFFICE.

FRED OPPENHEIMER, OF NEW YORK, N. Y.

RAILWAY-TICKET.

1,035,997.

Specification of Letters Patent.

Patented Aug. 20, 1912.

Application filed March 20, 1908. Serial No. 422,311.

*To all whom it may concern:*

Be it known that I, FRED. OPPENHEIMER, citizen of the United States, residing at New York city, in the county of New York and State of New York, have invented certain new and useful Improvements in Railway-Tickets, of which the following is a specification.

This invention relates to an improved railway transfer ticket specially designed for employment with means for systematizing the collection and regulation of street car fares and the issuing of transfers, which means is primarily characterized by the issuance of a ticket, check or the like as a reward receipt to each passenger immediately upon the collection of a cash or a transfer fare, which receipt is to be utilized as a complement of the novel form of transfer ticket in such a manner as to insure the collection of all cash fares, the collection of transfers and to regulate and control the issuance of transfers, and also to facilitate, and make accurate, the work of the inspectors and auditors.

In carrying out the foregoing general objects it will, of course, be understood that the minor details are susceptible to a wide range of modification without departing from the scope of the invention, but for illustrative purposes there are shown in the drawings certain preferred embodiments, in which drawings:

Figure 1 is a plan view of the obverse or front side of the fare receipt, preferably employed in carrying out the present invention. Fig. 2 is a similar view of the reverse side of the same receipt or ticket. Figs. 3 and 4 are views similar to Figs. 1 and 2 of the same kind and form of fare receipt, but of a different color, for use under certain conditions in carrying out the general idea of the invention. Fig. 5 is a plan view of the improved transfer ticket included in the present invention, the view illustrating that form of transfer employed in the antemeridian (A. M.) service. Fig. 6 is a similar view of the form of transfer ticket embodying the preferable indication for postmeridian (P. M.) service.

The improved transfer ticket as claimed herein is specially designed as only one of the units of a system for regulating the collection of street car fares and the issuing of transfers, and as its use can only be properly understood in connection with the complementary ticket, check, or like receipt, reference will first be made, by way of explaining the invention, to the latter feature of the system.

The ticket constituting the fare or the reward receipt is of any desired shape or size, but is usually of the conventional rectangular ticket form and consists of a ticket body 1, of paper or other material suitable for the purpose. This ticket body 1 has printed or otherwise placed on the obverse or front side thereof the various memoranda and indications which identify this ticket with the other parts of the system, but a distinguishing feature of this ticket is that the same bears on its front side a conductor's number in such a conspicuous manner as to be readily visible and thereby easily recognized when shown. For purposes of example, the said ticket or ticket body 1 is illustrated in the drawing as bearing in very large numerals the conductor's number, namely, "216." This is the most conspicuous matter on the ticket, and in order to connect the latter with the other parts of the system the same has printed thereon the name of the particular line, for instance, Main St. Line; the date, for instance, Nov. 21, the serial number of the ticket or receipt, for instance, 241, all of which matter may be arranged in any convenient way, but preferably as shown in the drawing, with the name of the car line below the conductor's number, and the date and the serial number of the ticket or receipt arranged at one end of the ticket body.

In addition to the features specified, the ticket 1 has printed on the front side thereof a marked space designated by the reference 2, for inspection purposes. This space may be provided with a plurality of punch indications *a*, *b*, and *c* and may be marked, for locating purposes, by the word "Examine" or any equivalent word, which would indicate that this is the portion of the ticket to be punched by inspectors or conductors when the passenger is called upon to deliver up the receipt for examination. Another detail which may be embodied in the ticket constituting the fare or reward receipt is that of a bills receipt space, designated by the reference 4, and within which is printed, for instance, the numerals 1, 2, and 5, which may be punched under certain conditions, hereinafter mentioned, when a conductor receives a 1, a 2 or a 5 dollar bill and postpones the giving of change to the passenger. This space can also be provided with designations for 25 ct. and 50 ct. or other denominations of coins or bills as may be desired. Furthermore, the ticket 1 constituting the fare or reward receipt may be provided at one end thereof with the tear-off corners 5 and 6, respectively marked A. M. and P. M. to indicate the ante-meridian or post-meridian service, and intended to be torn off or allowed to remain on the ticket according to the time of day when it is issued.

Various other details might be utilized on the front of the ticket 1 without affecting the invention, but in order to safe-guard the interests of the railway company to the greatest possible degree it is also preferable to provide the ticket 1 on the front side with a code mark 7, consisting of any suitable predetermined sign or symbol selected by the company as an identifying mark, and which it is intended should be frequently changed in practice.

In such localities where passengers are entitled to numerous changes of cars on one fare, the word "Final" or other word, or mark, conveying the same meaning, or covering the same purpose or intent shall be introduced as part of the system of the reward receipt. The intention is to punch this word or space provided in said reward receipt, when passengers are entitled to no further transfer accommodations. If thought preferable the "Final" or such other word or mark as might be utilized could be included in reward receipt as a tear-off coupon as suggested by the dotted lines on Figs. 1, 3 and 7. Thus when "Final" is torn off, it is an indication that no more transfers are obtainable.

Referring to the reward feature embodied in the invention, this is preferably provided for by publishing on the reverse side of the ticket 1 the prescribed conditions of reward, such, for instance, as illustrated in Fig. 2 of the drawings.

As above stated, under some conditions the fare or reward receipt 1 is used in distinguishing colors, such as yellow, or of other tint for one kind of receipt so that it may be readily distinguished from the original fare or reward receipt, which is preferably white. The tinted fare or reward receipt is designated by the reference 8 and is shown in Figs. 3 and 4 of the drawings. Aside from the distinguishing color tint the ticket or receipt 8 shown in said Figs. 3 and 4 embodies the same memoranda and indications as the original receipt which is shown in Figs. 1 and 2.

In connection with the reward receipt above described, the present invention contemplates combining therewith the improved transfer ticket shown in Figs. 5 and 6 of the drawings, and referring in the first place to the form of ticket shown in Fig. 5 it will be observed that the same embodies in its organization a ticket body 10 upon which is printed the novel arrangement of matter which is regarded as essential to the successful carrying out of the invention. A practical feature of this transfer ticket 10 is that the same embodies no tear off sections or coupons, but has the various memoranda and indications advantageously arranged and so related as to secure the very best results under every possible condition of service. In this connection, it should be noted that a prominent and important part of this transfer ticket resides in the provision of the same with a numbered identification space 11 confined within the main part of the ticket body between horizontally and vertically arranged lines 12—13 and 14—15 respectively. This identification space 11 is designed to be supplied with a plurality of rows of numerals arranged in separate denominational groups so that each group or row of such numerals will respectively represent units, hundreds and thousands. The said rows or groups of numerals are arranged in parallel order and each row or group includes a complete set of numerals, namely, "1, 2, 3, 4, 5, 6, 7, 8, 9.0." and at one end of each of said rows or groups of numerals, preferably at the left hand end, is printed the letter R, signifying repeat, and which is employed in the system in the manner hereinafter more fully explained.

In addition to the several rows of numerals arranged in denominational groups within the identification space 11, the latter space may have printed therein the code mark or sign 7, which is the same mark or sign as appears on the fare or reward receipt 1, thus linking the said receipt and said transfer together as parts of the same system. Also, in a conspicuous manner the principal transfer car lines are indicated in relatively large spaces 16 formed by a plurality of intersecting horizontal and vertical rulings or lines placed upon the ticket, preferably below the main numbered identification space 11. These relatively large spaces 16 may be conveniently referred to as the main transfer indication spaces in which are conspicuously printed the principal transfer car lines, such, for instance, as "34th street", "14th street", "59th street", "23rd street", "86th street", and "28th street". Less important and less frequently used transfer car lines may be conveniently listed in a block of secondary transfer indication spaces 17, blocked off upon one end portion of the transfer ticket, said spaces 17 having suitably printed therein the less important transfer car lines referred to, such, for instance, as "Christopher street", "Prince street", "Houston street", etc. And, one of said spaces arranged in the block 17 at one end of the ticket may be sufficiently large to constitute what may be termed a space for conditions, said space being designated by the reference 18 and bearing therein the conditions of transfer.

At the head of the transfer ticket, above the numbered identification space 11 there is provided a top heading space 19 within which is printed the name of the car line, such, for instance, as "Main St. Line"; the direction of travel on which the transfer will be honored, as "South", and the serial number of the transfer, as "Serial 100560".

At one end of the identification space 11 there is preferably inclosed a date space 20 in which is printed the date, as "Thursday, Nov. 21, 1907", and below such space 20 is blocked off validating spaces 21 and 22 utilized under certain conditions, such, for instance, as blocking of the line, or error, and said spaces are so identified by a suitable marking, such as "Blocked" and "Error".

The bottom portion of the transfer ticket is occupied by separate parallel rows of ruled off time spaces 23 and 24 respectively. The row of spaces 23 preferably extends the full length of the ticket and accommodates the hour numbers, namely, 1, 2, 3, 4, 5, 6, 7, 8, 9, 10, 11, and 12, while the lowermost time spaces 24 are conspicuously larger than those in the rows 23 and accommodate the fractional numbers of the hour which constitute the time limit for which the transfer will be honored, said fractional indications being respectively, 10, 20, 30, 40 and 50.

At one bottom corner of the ticket there may be blocked off a notice space 25 in which is printed a suitable notice, such as "Passengers are required to see that the time is correctly punched". At the correspondingly opposite corner of the ticket, preferably following the time space in the row 24, bearing the fifty minute indications, there is provided a meridian indication space 26 in which is printed either A. M. or P. M., according as the transfer is intended for antemeridian or post-meridian service. In the transfer ticket utilized for post meridian, or afternoon, evening and night service, the entire field for the identification space 11 and the main transfer indication spaces 16 is dark, preferably black, as providing the most effective and conspicuous post meridian indication for the transfer ticket. However, in this connection, it will be understood that the present invention is not restricted to having any particular portion or portions of the post meridian transfer ticket black or other dark color, as a larger or smaller area than that described may be utilized in this way without affecting the scope of the invention.

With the essential features of the several tickets in mind it may be stated that according to the plan of the present invention it is intended that each passenger shall receive a white reward receipt immediately upon the payment of his fare, and only this one receipt is given on the payment of the fare, inasmuch as the transfers are preferably intended to be only issued at or near the junction point to passengers desiring transfers and who show the reward receipt bearing the correct conductor's number. Upon the issuing of a transfer under these conditions the passenger keeps in his possession both tickets, namely the reward receipt 1 and the transfer ticket 10. On the first transfer line the passenger still retains in his possession the two tickets referred to and the conductor on such transfer line merely punches one of the indications in the inspection space 2 on the reward receipt, which space is marked "Examine." In this connection, the conductor can, at certain points, go through the car and inspect and punch all tickets in said inspection space marked "Examine." Likewise, an inspector, or other authorized person, can utilize said space for a similar purpose.

Still assuming the passenger to hold two tickets, namely, the original reward receipt and the transfer, while on the first transfer line, it may be noted that on the continuation of the journey the conductor of the next transfer car line collects both of said tickets and gives in return to the passenger a yellow or other colored reward receipt such as illustrated in Figs. 3 and 4 of the drawing, and bearing his particular number. Hence, these yellow or colored tickets indicate no cash fare received, but are a distinct check on the conductor, as he must have a white check to turn in for every yellow one given, as well as a corresponding transfer.

In utilizing the improved transfers herein described, it will be understood that either the conductor or some other authorized official or employee of the company punch in the identification space 11 of the transfers a number corresponding with the conductor's number on the reward receipt, and by reason of the denominational arrangement of numbers and the provisions for repeating in each row, a wide range of numbers may be punched up in the identification space 11. For instance, as an example, for a number with four numerals, as 1966, will be punched as follows, 1 in first row, nine in the second row, six on the third row, and R on the third row, indicating a repeating of the six.

If the conductor does the punching of the identification spaces 11 of the transfers he may do so all at the time when he receives them, thus causing no loss of time, as he usually receives the transfers when he is not occupied, but in all cases the numbers punched on the transfer must correspond with the number on the reward receipt.

It will, of course, be understood that various modifications and changes may be resorted to without effecting the invention, such, for instance, as utilizing the car number instead of the conductor's number, and also arranging for the giving out of transfers by a separate man at a junction or at certain junctions, but the principle of the system would in all cases remain exactly the same.

I claim:

A ticket of the class described, provided with an identification space containing a table of numerals arranged in a plurality of rows, said table also including repeat marks for indicating repetition of numerals in the rows.

In testimony whereof I hereunto affix my signature in the presence of two witnesses.

FRED OPPENHEIMER.

Witnesses:
 EDWARD KAUFMANN,
 BELLA L. RUNKEL.

Copies of this patent may be obtained for five cents each, by addressing the "Commissioner of Patents, Washington, D. C."